United States Patent
Kuwabara

(10) Patent No.: US 6,400,384 B1
(45) Date of Patent: Jun. 4, 2002

(54) IMAGE FORMING APPARATUS AND METHOD SHORTENING FIRST PRINTING TIME

(75) Inventor: Yoshihiro Kuwabara, Koshigaya (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/482,104

(22) Filed: Jan. 13, 2000

(30) Foreign Application Priority Data

Jan. 13, 1999 (JP) .......................................... 11-006993

(51) Int. Cl.[7] .......................... B41J 2/385; G03G 13/04
(52) U.S. Cl. ........................................ 347/129; 347/261
(58) Field of Search ................................. 347/231, 241, 347/243, 259, 260, 261, 129, 254

(56) References Cited

U.S. PATENT DOCUMENTS

| | | | | |
|---|---|---|---|---|
| 4,589,764 A | * | 5/1986 | Tadokoro et al. | |
| 4,894,669 A | * | 1/1990 | Sugiura et al. | 347/129 X |
| 5,194,879 A | * | 3/1993 | Kotabe et al. | 347/254 |
| 5,294,945 A | * | 3/1994 | Omura et al. | |
| 5,475,414 A | * | 12/1995 | Isaka et al. | 347/129 |

FOREIGN PATENT DOCUMENTS

| | | | |
|---|---|---|---|
| JP | 62-237864 | * | 10/1987 |
| JP | 1-105970 | * | 4/1989 |
| JP | 2-141770 | * | 5/1990 |
| JP | 3-92365 | * | 4/1991 |
| JP | 3-129367 | * | 6/1991 |
| JP | 05-53074 | * | 3/1993 |

* cited by examiner

Primary Examiner—Susan S. Y. Lee
(74) Attorney, Agent, or Firm—Oblon, Spivak, McClelland, Maier & Neustadt, P.C.

(57) ABSTRACT

An image forming apparatus for forming an image on a photoconductor by scanning light on the photoconductor includes a printer engine having a polygon motor that can be controlled to revolve at an arbitrary rate of revolution, a deflector driven by the polygon motor to be rotated to deflect the light, and a motor controller to control the revolution of the polygon motor. The apparatus further includes a controller to control the apparatus. The apparatus is connected with a host computer, and the polygon motor is controlled to stop revolving when the apparatus is in a waiting status. When the apparatus is set to form the image with a single picture element resolution, the controller outputs to the printer engine a request to revolve the polygon motor immediately after receiving a printing instruction to form the image from the host computer and a printing request to form the image after completing image processing for forming the image.

12 Claims, 14 Drawing Sheets

| DPI SIGNAL | PICTURE ELEMENT RESOLUTION (DPI) | NUMBER OF REVOLUTIONS (rpm) | LOCKING TIME (sec) |
|---|---|---|---|
| 00 | 200 | 6000 | 2.0 |
| 01 | 240 | 7200 | 2.2 |
| 10 | 300 | 9000 | 2.5 |
| 11 | 400 | 12000 | 3.0 |

FIG. 9A
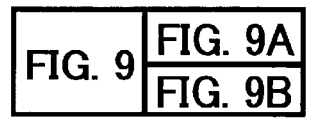
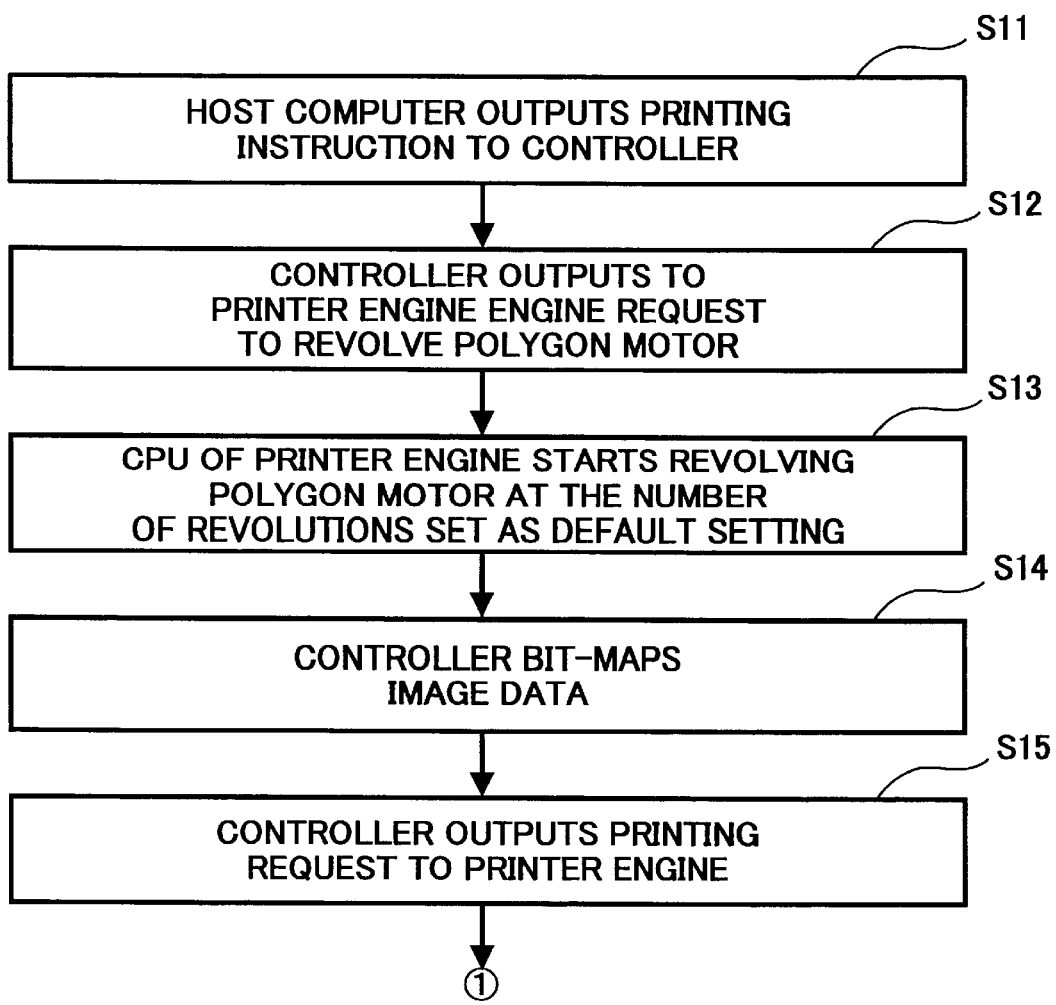

| FEEDING CASSETTE | FEEDING TIME TO REGISTRATION ROLLER |
|---|---|
| 1ST | 1.0S |
| 2ND | 2.0S |
| 3RD | 3.0S |
| MANUAL | 1.0S |

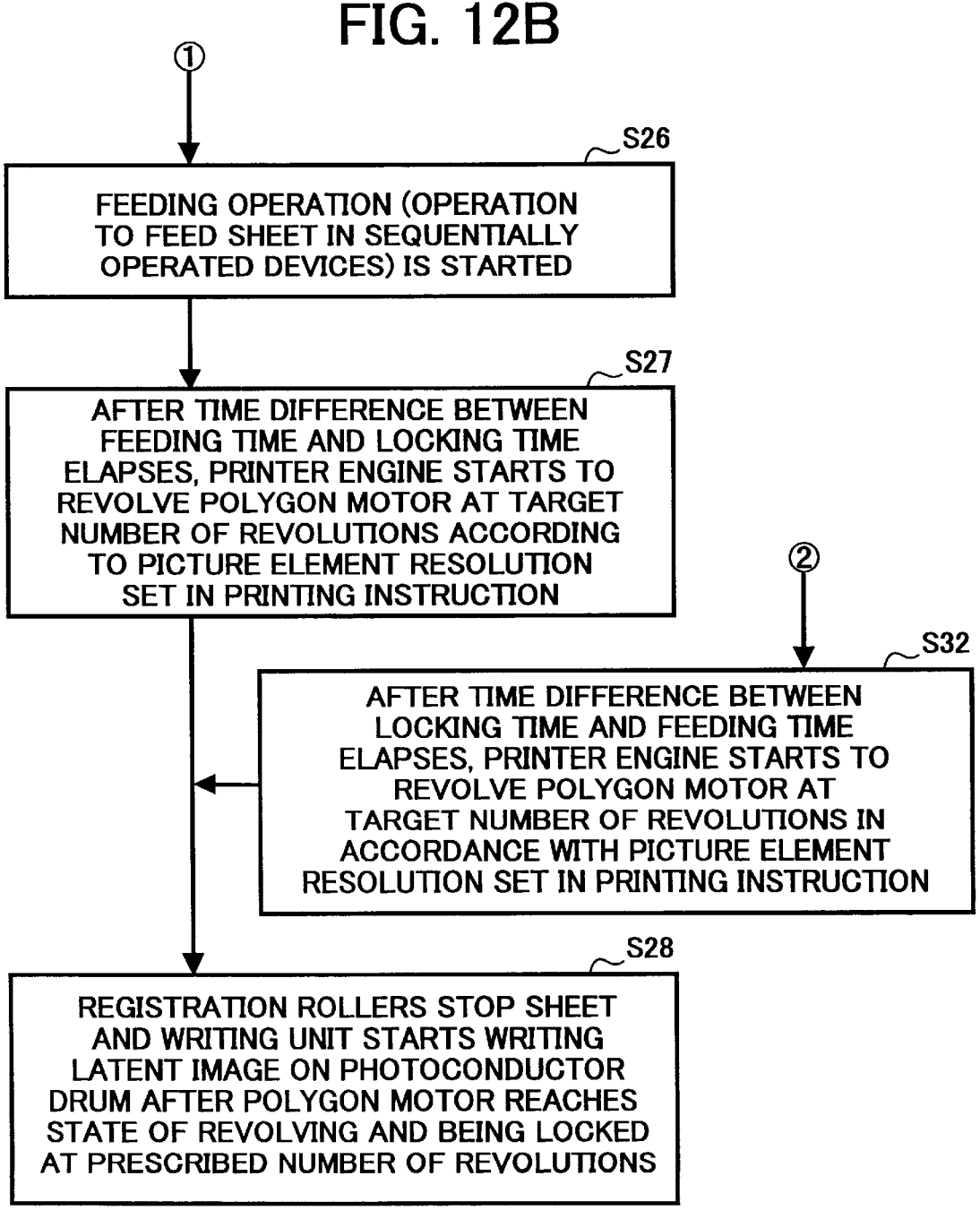

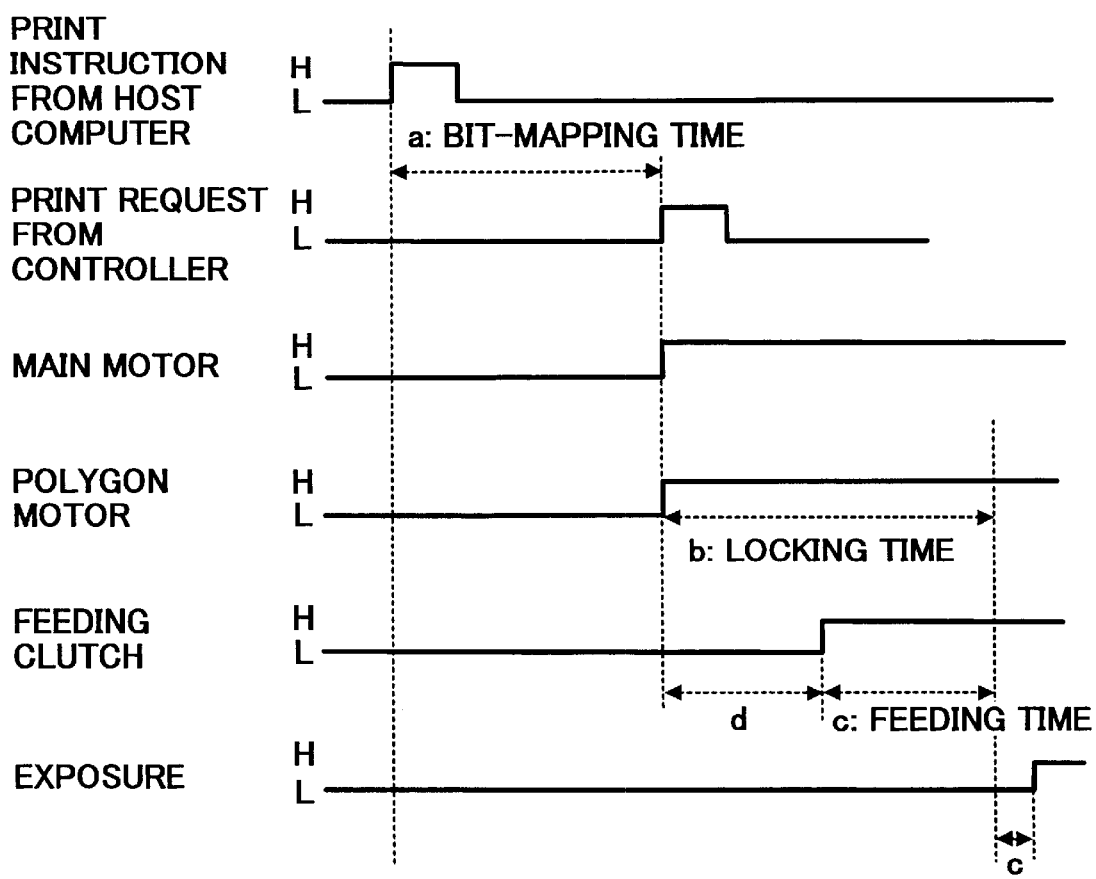

IMAGE FORMING APPARATUS AND METHOD SHORTENING FIRST PRINTING TIME

BACKGROUND OF THE INVENTION

1. Field of the Invention

The present invention relates to image forming apparatuses, such as copying machines, facsimile machines and printers, that have a printer engine to form an image by scanning a laser beam light using a rotating polygonal deflector deflecting the laser beam light and a motor rotating the polygonal deflector. More particularly, the present invention relates to an image forming apparatus and method to shorten the printing time for a first print sheet by shortening the time a motor rotating a polygonal deflector takes to revolve at a predetermined rate from a rest state.

2. Discussion of the Background

A laser beam printer is a known image forming apparatus having a printer engine for forming an image by scanning a laser beam light using a rotating polygonal deflector deflecting the laser beam light and a motor rotating the polygonal deflector (hereinafter polygon motor). The laser beam printer writes an image on a photoconductor by scanning the laser beam in the main scanning direction with rotation of the polygonal deflector while changing the scanning start position in the sub-scanning direction each time one scanning in the main scanning direction is completed. The laser beam printer is superior in the fast printing speed and high resolution of the printed image compared to other types of printers such as dot matrix impact printers. With recent increasing demand for higher resolution of images printed on print sheets, the demand for better resolution of picture elements (expressed by DPI (dot per inch)) of image forming apparatuses has also increased. Some laser printers offer a capability of selecting a desired picture element resolution from among a plurality of picture element resolutions according to the intended use of the output prints.

When the resolution of picture elements is increased, the number of revolutions of a polygon motor driving a polygonal deflector to be rotated has to be proportionally increased. For example, if the number of revolutions of the polygon motor when the picture element resolution is 200 dpi is 6000 rpm (revolutions per minute), for increasing the picture element resolution to 400 dpi, the number of revolutions of the polygon motor is required to be increased to 12000 rpm. In addition, unless the polygon motor reaches a state of revolving at a predetermined number of revolutions in a relatively short time after starting to revolve, such high speed feature of a laser beam printer is impaired. Therefore, the polygon motor is required to have a relatively short starting time to reach a state of revolving at a predetermined number of revolutions after starting to revolve, in addition to such features as stable revolutions at a relatively high speed, a long life time of bearings used in the motor such that the motor is suitable for use for a long time, and low electric consumption so that the heat emission is suppressed.

For shortening the starting time of a polygon motor, for example, the motor can be kept revolving at a high speed revolution even during a waiting period of an image forming apparatus in which the motor is used. However this causes the life time of the bearings of the motor to be decreased by a factor of several inverse squares of the number of revolutions of the polygon motor. Therefore, the polygon motor generally is stopped during the waiting period of the apparatus and is revolved when a printing operation starts.

Further, an operation of feeding a print sheet is generally started after a lock signal is detected indicating that the polygon motor has reached a state of revolving at a predetermined number of revolutions. However, for shortening the printing time, some image forming apparatuses are configured such that a print sheet is fed to reach an interim point of an image forming portion of the apparatus during the starting time of the polygon motor in order to reach a locked state at a predetermined number of revolutions. That is, the time the polygon motor takes to reach the locked state is estimated in advance with a controller of the image forming apparatus and the printing time is shortened by interleaving (1) the time required for feeding a first print sheet for a first printing job to the interim point of the image forming portion of the apparatus and (2) the time required for the polygon motor to reach the locked state.

However, the time required for a polygon motor to reach the locked state varies depending upon the apparatus in which the motor is used and depending upon the change of the apparatus according to the elapse of time. Therefore, the time to start feeding a first print sheet (i.e., the time. the first print sheet waits to be started to be fed after the revolution of a polygon motor is started) needs to be set such that the first sheet will not reach an image forming portion of the apparatus before the polygon motor reaches the locked state at a predetermined high speed. Accordingly, the timing generally is set such that a first printing operation, such as transferring a toner image to a print sheet from a photoconductor, is performed sufficiently after the polygon motor has been locked.

Also, a method has been proposed in which a polygon motor is revolved at a rate lower than a predetermined rate during a waiting period of the image forming apparatus and the time required for the polygon motor to reach a locked state for printing an image on a first print sheet is shortened. In this case also, the number of revolutions of the polygon motor in the waiting period generally is set higher than an optimum number of revolutions that enables the polygon motor to be locked, after a printing instruction has been received, at a timing closest to the timing when feeding of the first print sheet to the image forming portion is completed (i.e., when the time to feed the sheet to the image forming portion ends). Further, in image forming apparatuses, for coping with a variation in the time a polygon motor takes to reach a locked state resulting from variations in different types of apparatuses or from a change in the apparatus after the elapse of time, the operation of feeding a sheet is started well after the polygon motor has started to revolve.

However, in controlling the timing of starting the operation of feeding a sheet, the difference in the number of revolutions of the polygon motor according to the difference in the picture element resolution is not generally considered, and the timing is controlled simply based upon the longest time the polygon motor takes to reach the locked state, irrespective of the picture element resolution. Therefore, it occurs that the printing time for a first sheet is not shortened, depending upon the picture element resolution. Further, generally, the difference between (1) the time a sheet contained in one of a plurality of sheet cassettes takes to reach an image forming portion after having been started to be fed and (2) the time another sheet in another one of the plurality of sheets cassettes takes, generally, is not considered in controlling the timing of feeding the respective sheets. Also, the timing is uniformly set based upon the longest time a sheet takes to reach the image forming portion after the sheet has started to be fed. Therefore, it occurs that the high speed revolution of the polygon motor is uselessly continued while waiting for a print sheet to reach the image forming portion, and thereby, the life time of bearings of the motor is decreased.

FIG. 14 is a timing chart illustrating an example of the operating timings of an image forming apparatus, starting from receipt of a printing instruction from a host computer to an exposure (image writing) of a photoconductor drum. The time when the signal is made high in an operation of receiving a printing instruction from a host computer indicates a time when the printing instruction from the host computer is received by a controller of the image forming apparatus. The time when the signal is made high in an operation of outputting a printing request from the controller indicates a time when the controller outputs the printing request to the printer engine of the image forming apparatus. The time when the signal is made high in an operation of a main motor is a time when the main motor starts to revolve to feed a sheet. The time when the signal is made high in an operation of a polygon motor is a time when the polygon motor starts to revolve to rotate a polygonal deflector. The time when the signal is made high in an operation of the sheet feeding clutch is the time when the sheet feeding clutch is connected to the main motor so as to transmit the revolution of the main motor to a feeding roller to feed the sheet. The time when the signal is made high in an operation of an exposure is a time when the exposure of a photoconductor drum is started.

In FIG. 14, an image bit-mapping time "a" indicates the time the controller of the image forming apparatus takes to complete bit-mapping of image data after receiving the printing instruction for the image data from the host computer. A locking time "b" indicates the time the polygon motor takes to reach a stably locked state of revolving at a predetermined number of revolutions after having started to revolve in response to the printing request. A sheet feeding time "c" indicates the time required for a print sheet to reach a registration roller after the feeding clutch is connected to the main motor. A time "d" indicates the difference between the locking time "b" and the sheet feeding time "c." A time "e" indicates the difference between the time required for the print sheet to be fed from the registration roller to a transfer position where a toner image is transferred from the photoconductor drum to the print sheet and the time required for the photoconductor drum to rotate such that an exposed portion of the photoconductor drum moves from an exposure position to the transfer position. That is, the time "e" delays the exposure time such that the exposure time matches the time of the print sheet to be fed to the transfer position from the registration roller.

As illustrated in FIG. 14, if a printing instruction is received by the controller of the image forming apparatus from the host computer, the controller outputs a printing request to the printer engine of the apparatus after the controller forms bit-map image data during the image bit-mapping time "a." The printer engine starts the main motor and the polygon motor to rotate the polygonal deflector after the receipt of the printing request from the controller. The printer engine starts feeding a print sheet by connecting the feeding clutch to the main motor during the time "d," which is the difference between the locking time "b" and the sheet feeding time "c," after starting the main motor and the polygon motor.

However, because the sheet feeding time "c" of FIG. 14 is set such that the sheet reaches the image forming portion well before the polygon motor reaches a locked state, as described above, the polygon motor will not reach the state of revolving at a predetermined rate when the first sheet has reached the registration roller. Therefore, the first sheet waits at the registration roller until the polygon motor reaches the state of revolving at the predetermined rate. That is, when an image is formed on a first print sheet, a waiting time occurs for the polygon motor to reach a state of revolving at a predetermined number of revolutions.

Further, when (1) an image forming apparatus includes a plurality of sheet feeding cassettes and (2) a time for a sheet to reach an image forming position of the apparatus after having been started to be fed is longer than a time for a polygon motor to reach a state of revolving at a predetermined number of revolutions corresponding to a picture element resolution after receiving a request to revolve the polygon motor, the polygon motor reaches the state of revolving at the predetermined rate before a first sheet reaches a registration roller. As a result, the first sheet waits at the registration roller for the polygon motor to reach the state of revolving at the predetermined rate. Furthermore, if a controller of an image forming apparatus erroneously operates after a request to revolve a polygon motor is received and the polygon motor has started revolving, the polygon motor uselessly continues to revolve at a predetermined number of revolutions and as a result the life of bearings of the polygon motor is reduced.

SUMMARY OF THE INVENTION

The present invention has been made in view of the above-discussed and other problems and addresses the above-discussed and other problems.

The present invention provides a novel image forming apparatus and method that does not require a waiting time for a first print sheet, which is fed after a printing instruction from a host computer has been received. Since there is no waiting time for a polygon motor to reach a state of revolving at a predetermined number of revolutions for forming an image on the first sheet, the life of bearings of the polygon motor is lengthened by avoiding useless revolutions of the polygon motor at the predetermined rate for coping with the effects of variation and changes in the characteristics of the polygon motor over time.

The present invention also provides a novel image forming apparatus and method in which a polygon motor does not reach a state of revolving at a predetermined rate after a printing instruction from a host computer has been received before a first print sheet reaches a registration roller. The present invention also avoids useless revolution of the polygon motor at the predetermined rate for coping with variation in the time for the polygon motor to reach a locking state and changes in the characteristics of the polygon motor over time. Thereby, the life of the polygon motor is lengthened.

A novel image forming apparatus and method stops a polygon motor if a printer engine does not receive a printing request from a controller of the image forming apparatus within a predetermined time after the printer engine has received a polygon motor revolution request. In this manner, the present invention avoids revolving the polygon motor uselessly and lengthens the life of the bearings of the polygon motor.

Preferably, the image forming apparatus forms an image on a photoconductor by scanning light on the photoconductor and includes a printer engine having a polygon motor that can be controlled to revolve at an arbitrary rate. The apparatus also includes a deflector driven by the polygon motor to be rotated to deflect the light and a motor controller to control the revolution of the polygon motor. The apparatus further includes a controller to control the apparatus. The apparatus is connected to a host computer, and the polygon motor is controlled to stop revolving when the apparatus is in a waiting status. When the apparatus is set to form the image with a single picture element resolution, the controller outputs to the printer engine a request to revolve the polygon motor immediately after receiving a printing instruction to form the image from the host computer and a printing request to form the image after completing image processing for forming the image.

When the apparatus is set to form the image with a selected one of a plurality of picture element resolutions, the controller outputs to the printer engine the request to revolve the polygon motor. The request includes information regarding the selected picture element resolution for forming the image immediately after receiving the printing instruction from the host computer and the printing request to form the image after completing the image processing for forming the image.

Furthermore, the controller may output to the printer engine the request to revolve the polygon motor according to a picture element resolution previously set in the printer engine immediately after receiving the printing instruction from the host computer and the printing request. The printing request includes information regarding a revolution speed of the polygon motor corresponding to the selected picture element resolution for forming the image after completing the image processing for forming the image.

Further, the controller outputs to the printer engine the request to revolve the polygon motor a predetermined time after having outputted to the printer engine the printing request to form the image when (1) the image forming apparatus include a plurality of print sheet feeding devices to feed a print sheet therefrom and (2) a first time that is required for the print sheet to reach a registration roller to adjust a timing of the sheet to be fed to a transfer position of the printer engine where the image on the photoconductor is transferred to the sheet after the sheet has started to be fed is longer than a second time that is required for the polygon motor to reach a state of revolving at the rate corresponding to the selected picture element resolution for forming the image after the printer engine has received the request to revolve the polygon motor.

Furthermore, the printer engine may stop to revolve the polygon motor when the printer engine does not receive the printing request from the controller in a predetermined time after having (1) received the request to revolve the polygon motor from the controller and (2) started to revolve the polygon motor.

BRIEF DESCRIPTION OF THE DRAWINGS

A more complete appreciation of the present invention and many of attendant advantages thereof will be readily obtained as the same becomes better understood by reference to the following detailed description when considered in connection with the accompanying drawings, wherein:

FIG. 14 is a timing chart illustrating an example of the operating timing of a background image forming apparatus.

DETAILED DESCRIPTION OF THE PREFERRED EMBODIMENTS

Figure 1:
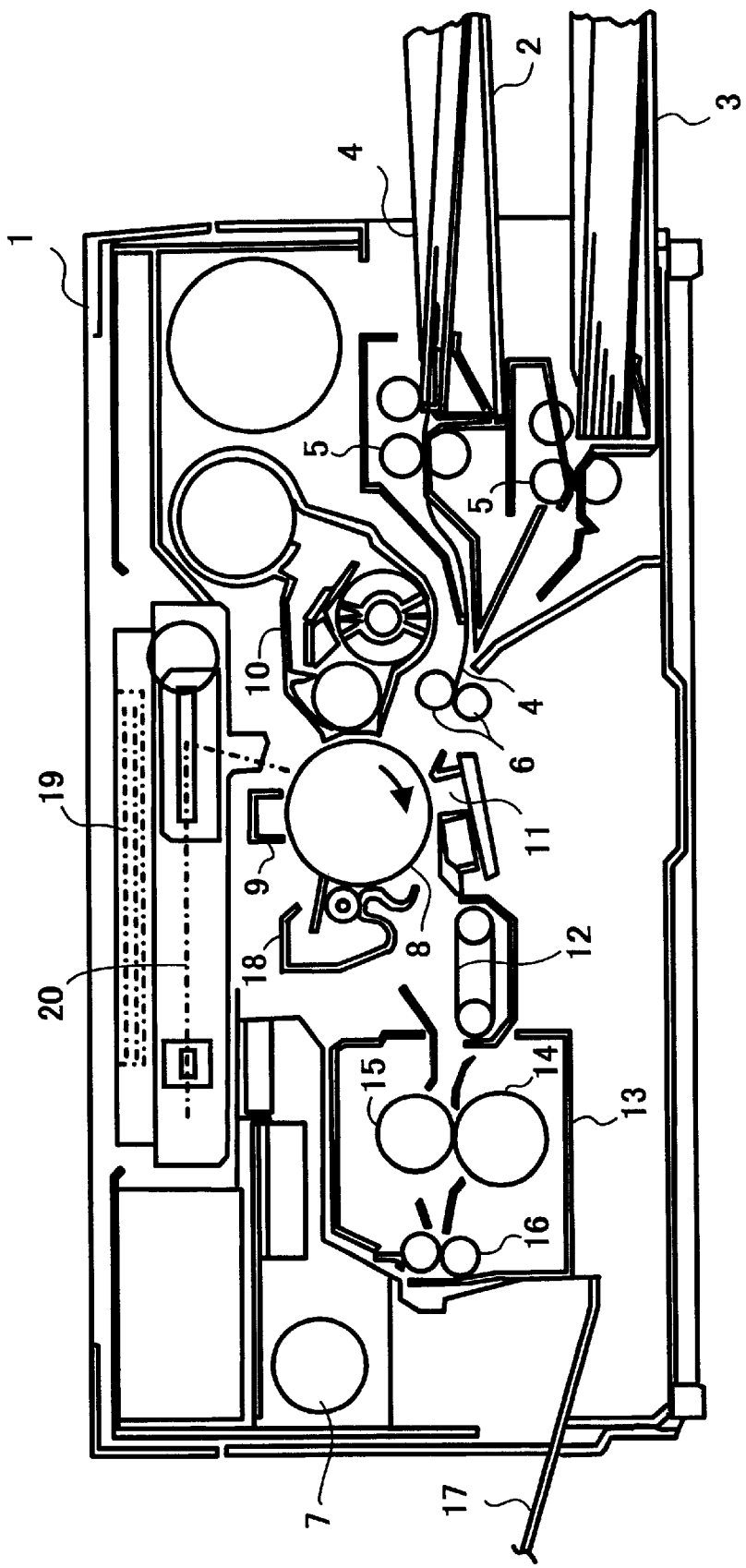
FIG. 1 is a schematic drawing illustrating an exemplary construction of a laser printer as an example of an image forming apparatus according to the present invention.

Referring now to the drawings, wherein like reference numerals designate identical or corresponding parts throughout the several views, and more particularly to FIG. 1 thereof, an internal construction of a laser beam printer is shown as an example of an image forming apparatus according to an embodiment of the present invention. As illustrated in FIG. 1, a laser beam printer 1 according to an embodiment of the present invention includes two sheet feeding cassettes 2, 3 vertically arranged, each containing print sheets 4. Sheet feeding rollers 5 feed out one of the sheets 4a from the cassettes 2, 3. A pair of registration rollers 6 temporarily stop the fed sheet 4a so as to adjust the timing to feed the sheet 4a to a transfer position. A main motor 7 supplies power to each roller to feed the sheet 4a and a photoconductor drum 8 as an image bearing member and so forth. The photoconductor drum 8 forms an image on its surface. A charging device 9 charges the surface of the photoconductor drum 8. A developing unit 10 develops a latent image formed on the surface of the photoconductor drum 8 with toner to form a toner image. A transfer charger 11 charges the sheet 4a such that the toner image is transferred from the photoconductor drum 8 onto the sheet 4a. A conveying belt 12 conveys the sheet 4a carrying the transferred toner image. A toner image fixing device 13 includes a pressure roller 14 to press the sheet 4a and a fixing roller 15 to press and heat the sheet 4a. The toner image is fixed onto the sheet 4a when the sheet 4a passes through the pressure roller 14 and the fixing roller 15. A sheet exiting roller 16 discharges the sheet 4a carrying fixed toner image, and an exit tray 17 receives the discharged sheet 4a. A cleaning unit 18 removes residual toner remaining on the photoconductor drum 8. A printed circuit board 19 mounts a controller (described below) and an engine driver etc. A writing unit 20 forms an image on the photoconductor drum 8 with a scanning laser light beam.

The sheet 4a fed from either of the sheet feeding cassettes 2, 3, for example, from the cassette 2 by the feeding roller 5, is temporarily stopped at the registration rollers 6 to properly time the feeding of the sheet 4a to the transfer position of the photoconductor drum 8. The surface of the photoconductor drum 8 is rotatably driven in the clockwise direction by the main motor 7 and is uniformly charged with the charging device 9. An electrostatic latent image is formed on the surface of the photoconductor drum 8 by scanning the surface of the photoconductor drum 8 with a laser beam light modulated according to image data received from the writing unit 20. The electrostatic latent image formed on the photoconductor drum 8 is developed into a visible toner image by applying toner to the latent image with the developing device 10. The toner image is then transferred by the transfer charger 11 to a sheet 4a, which has been conveyed at a time adjusted by the registration rollers 6. The sheet 4a carrying the transferred toner image is separated from the photoconductor drum 8 to be conveyed to the fixing unit 13 by the transfer belt 12. The sheet 4a is pressed between the pressure roller 14 and the fixing roller 15 and the toner image is fixed onto the sheet 4a by the pressure and the heat of the fixing roller 15, which is pre-heated. The sheet 4a passes through the fixing unit 13 and is discharged by the exit roller 16 to the exit tray 17 provided to a side of the printer 1. The toner remaining on a surface of the photoconductor drum 8 is removed and collected by the cleaning unit 18.

The timing of the transfer of the toner image to the sheet 4a from the photoconductor drum 8 is adjusted by causing writing of the electrostatic image on the photoconductor drum 8 (i.e., the exposure of the photoconductor drum 8) to be started, after a polygon motor to rotate a polygonal deflector reaches a state of revolving at a predetermined rate, in synchronism with a timing of re-starting the feeding of the sheet 4a, which has been stopped at the registration rollers 6.

Figure 2:
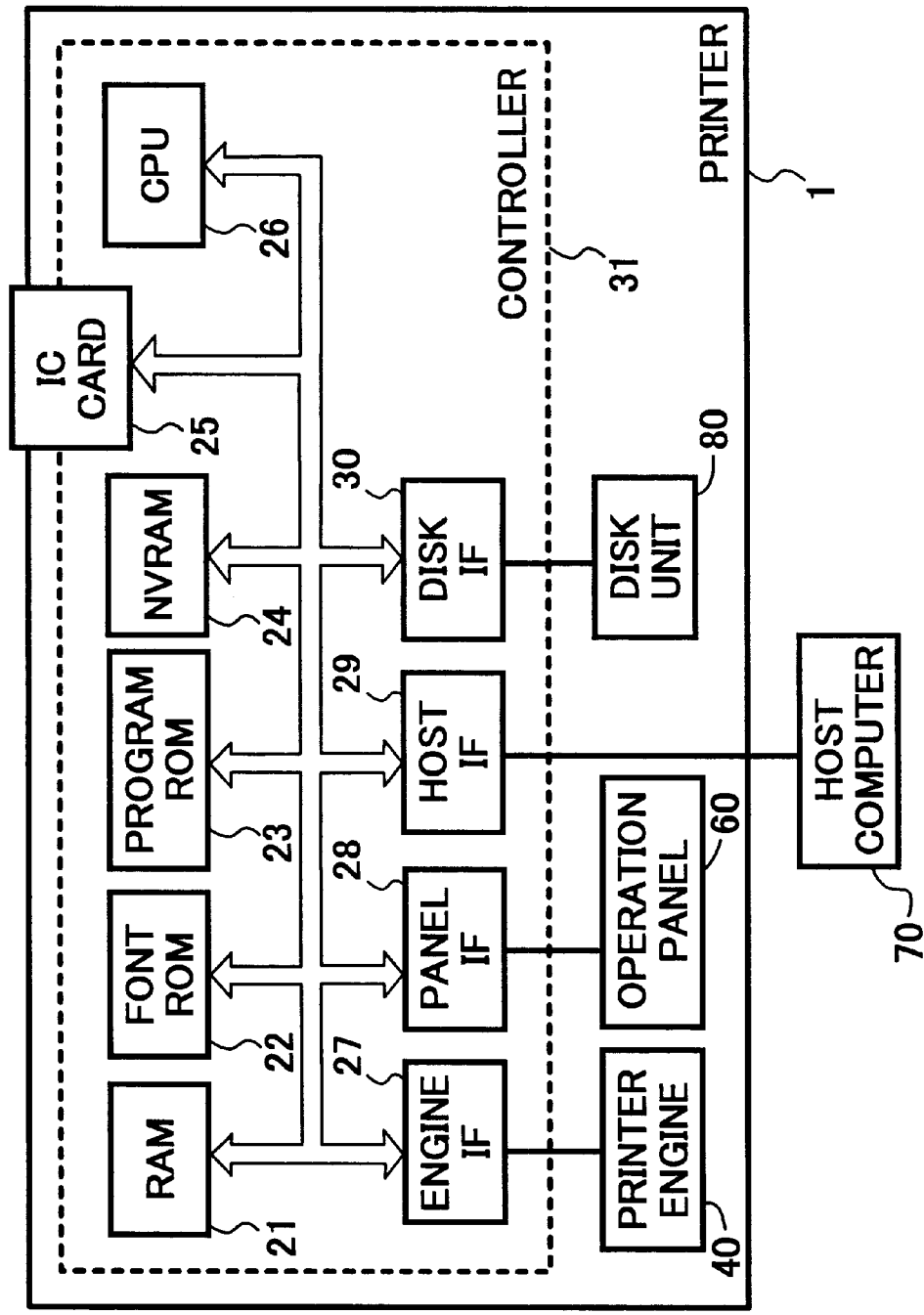
FIG. 2 is a block diagram illustrating an exemplary construction of a controller of the printer with related devices in the printer.

FIG. 2 is a block diagram of a controller of the printer 1, including illustrations of related units in the printer 1. The printer 1 is connected to a host computer 70, and data is transmitted and received therebetween. The printer 1 includes a controller 31 to process image data and to generate and output instructions for printing the image data etc. and for controlling a printer engine 40 to form an image. The printer 1 further includes an operation panel 60 to display messages informing the operator of a status of the printer 1. The operation panel 60 enables the operator to input instructions, such as an instruction designating an operating mode. A disk unit 80 includes a floppy disk (FD) unit and a hard disk (HD) unit to store various data, such as font data, programs and print data.

The controller 31 includes a RAM 21 for use as a work memory for a CPU 26 (described later), an input buffer for input data, a page buffer for print data, and a memory to store font data to be downloaded; a font ROM 21 to store pattern data of fonts etc.; a program ROM 23 to store control programs of the controller 31; a NVRAM (non-volatile RAM) 24 to store contents of the instructions inputted via the operation panel 60; an IC card 25 storing font data and programs to be supplied to the printer 1, the CPU 26 controlling the controller 31 with the programs in the program ROM 23, the instructions from the operation panel 60 and commands from the host computer 70; a printer engine interface (IF) 27 for communicating commands, status information and printing data with the printer engine 40; a panel interface (IF) 28 communicating commands and status information with the operation panel 60; a host interface (IF) 29 including, for example, a centronics interface (IF) or RS 232C, to communicate with the host computer 70; and a disk interface (IF) 30 to communicate with the disk unit 80. Each of the above units is connected with each other via an internal bus 33. Further, the engine interface 27 and the printer engine 40, the panel interface 28 and the operation panel 60, the host interface 29 and the host computer 70, and the disk interface 30 and the disk unit 80 are respectively connected by a connecting cable or the like.

Figure 3:
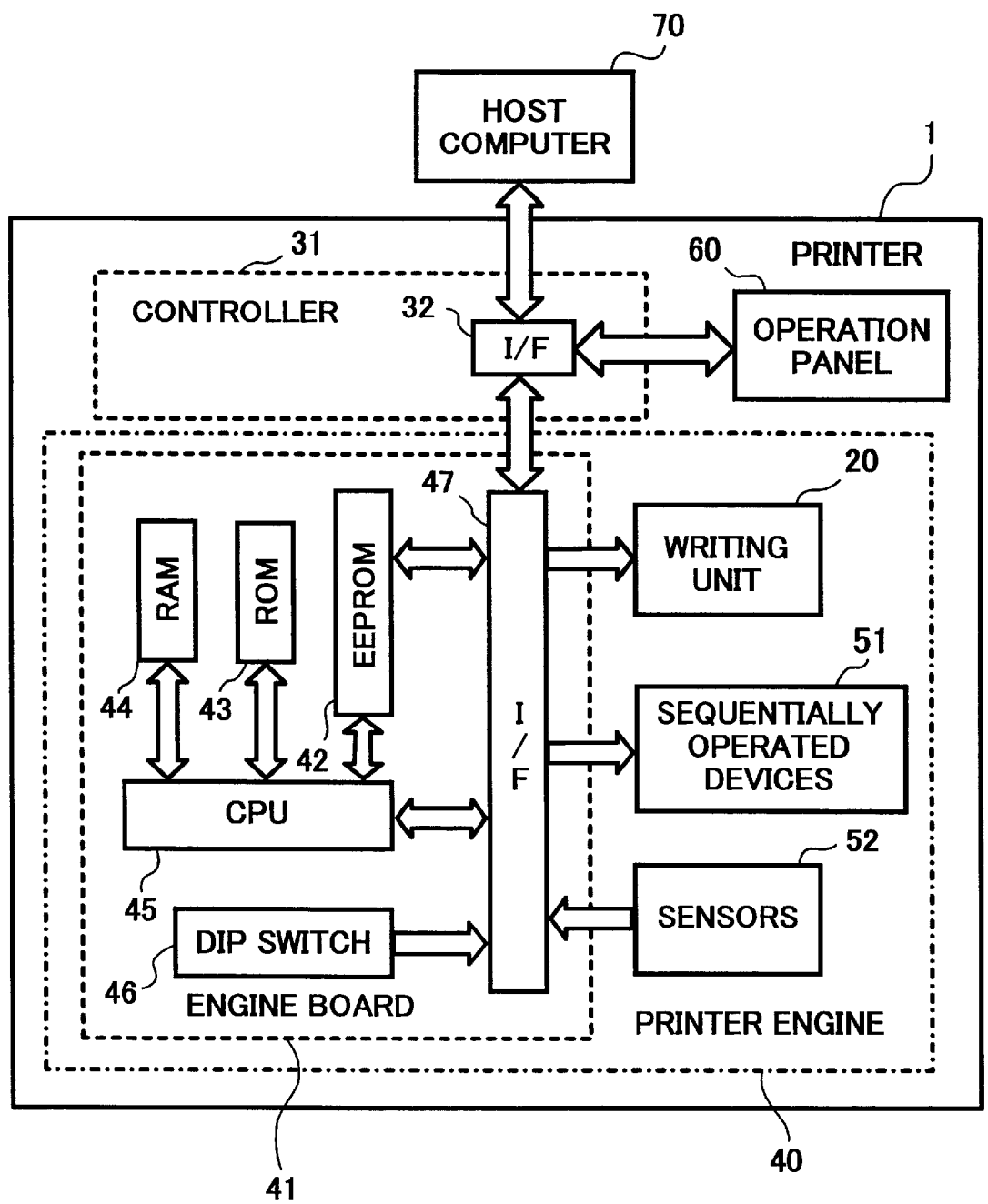
FIG. 3 is a block diagram illustrating an exemplary construction of a printer engine of the printer with related devices in the printer.

FIG. 3 is a block diagram illustrating an exemplary construction of the printer engine 40 with related units in the printer 1. The printer 1 of FIG. 3 is also connected with the host computer 70 communicating data therebetween. The printer 1 includes the controller 31 to process image data and generate and output instructions for printing the image data, the printer engine 40 to form an image, and the operation panel 60 to display messages informing the operator of a status of the printer 1 and to enable the operator to input instructions such as an instruction designating an operating mode.

The controller 31 includes an interface 32 for communicating with the host computer 70, the printer engine 40 and the operation panel 60. The interface 32 therefore includes the interfaces 27–30 illustrated in FIG. 2.

The printer engine 40 includes an engine board 41 for controlling the printer engine 40; the writing unit 20 having a laser diode and a polygon motor etc.; a group of sequentially operated devices 51 including fixing, developing and driving systems, which are sequentially controlled; and sensors 52 to detect each operating status of the sequentially operated devices 51 and a sheet conveyed through a conveying path. The engine board 41 includes an EEPROM 42 as a non-volatile memory to store an error record of the printer engine 40 and contents of the instructions from the operation panel 60 etc., a ROM 43 as a memory to store control programs of the printer engine 40, a RAM 44 for use as a working memory for a CPU 45 described later and an inputting buffer memory for input data, the CPU 45 controlling the printer engine 40 according to commands from the controller 31, a DIP (dual in-line package) switch 46 to set a printer engine control mode, and an input and output interface 47 for the engine board 41. The input and output interface 47 is connected to the interface 32 of the controller 31 via a connecting cable or the like. The input and output interface 47 is connected with the EEPROM 42, the CPU 45, and the DIP (dual in-line package) switch 46 via an internal bus. Further, the CPU 45 is connected with the EEPROM 42, the ROM 43, and the RAM 44 via an internal bus.

Figures 4, 5:
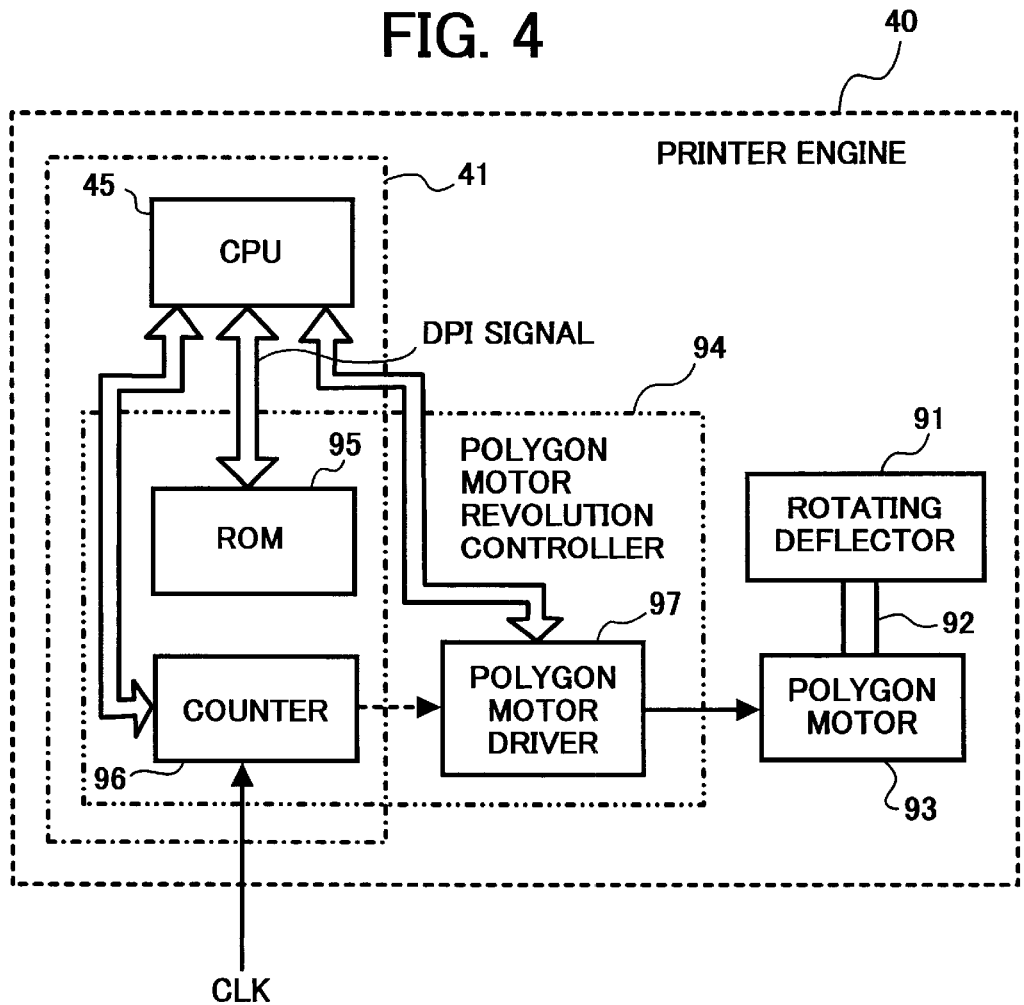
FIG. 4 is a block diagram illustrating a polygon motor and related devices in the printer engine of FIGS. 2 and 3.
FIG. 5 is a table showing the relationship between a DPI signal, a picture element resolution (DPI), the number of revolutions per minute (rpm) and a locking time (seconds) of the polygon motor.

FIG. 4 is a block diagram illustrating a polygon motor and related devices in the printer engine 40 of FIGS. 2 and 3. The printer engine 40 includes a rotating deflector 91, for example, a polygonal mirror, to scan a laser beam light, a rotating axis 92 to rotate the rotating deflector 91, a polygon motor 93 generating a driving force to rotate the rotating deflector 91, the engine board 41 described above, and a polygon motor driver 97 outputting a driving signal to drive the polygon motor 93. The polygon motor driver 97 is mounted on a substrate connected to the polygon motor 93. The engine board 41 includes the CPU 45 described above, a ROM 95 storing information regarding the number of revolutions corresponding to information regarding the picture element resolution and a counter 96 outputting a timing signal corresponding the information regarding the number of revolutions by counting a clock signal input at a predetermined cycle. The ROM 95 may be configured to be included in the ROM 43 or separate from the ROM 43. A polygon motor revolution controller 94 includes the ROM 95, the counter 96, and the polygon motor driver 97. The controller 94 also controls the revolution of the polygon motor 93. The polygon motor driver 97 outputs a driving signal for the polygon motor 93 in accordance with a timing signal input from the counter 96. The ROM 95 inputs a DPI signal (described later) as an address signal and outputs a frequency demultiplying ratio stored in advance in the corresponding address to the counter 96 so as to be registered.

In FIG. 4, the DPI signal outputted from the CPU 45 is received by the ROM 95. The DPI signal is a two bit code signal used by the CPU 45 for designating the number of revolutions corresponding to a picture element resolution (DPI) to the polygon motor revolution controller 94. The relationship between the DPI signal and the number of revolutions of the polygon motor 93 is shown in FIG. 5 and will be described later. The ROM 95 outputs information regarding the number of revolutions (frequency de-multiplying ratio) corresponding to the received DPI signal (address signal) to the CPU 45. The CPU 45 then counts the clock signal input to the counter 96. Each time when the counted value reaches a registered frequency de-multiplying ratio, the CPU 45 clears the counted value and re-starts counting and outputs a pulse signal to the CPU 45. The polygon motor driver 97 outputs to the polygon motor 93 a driving pulse signal synchronized with the pulse signal obtained by de-multiplying the clock signal inputted from the CPU 45 with the registered de-multiplying ratio so as to revolve the polygon motor 93 in synchronism with the signal signal. The pulse signal output from the counter 96 may be directly input to the polygon motor driver 97 without involving the CPU 45.

FIG. 5 is a table indicating an exemplary relationship among a DPI signal, a picture element resolution (DPI), the number of revolutions (rpm), and a locking time (second) of the polygon motor 93. In FIG. 5, for example, the picture element resolution corresponding to the DPI signal code "00" is 200 dpi and the corresponding number of revolutions is 6000 rpm and the corresponding locking time is 2.0 sec. Accordingly, the CPU 45 receiving a printing instruction with the picture element resolution of 200 dpi outputs the code "00" to the ROM 95 and obtains the information that the number of revolutions is 6000 rpm. The CPU 45 then sets the counter 96 so as to output a timing signal when the counted value of the clock signal reaches the value corresponding to 6000 rpm. The CPU 45 receiving the timing signal from the counter 96 outputs the received timing signal to the polygon motor driver 97. The polygon motor driver 97 outputs a driving signal to drive the polygon motor 93 at 6000 rpm in accordance with the received timing signal. Thus, the CPU 45, which receives a signal of a picture element resolution from the controller 31, controls the number of revolutions of the polygon motor 93.

In the above printer 1 of FIGS. 1–4, the controller 31 is configured to output an interface command for revolving only the polygon motor 93 in the printer engine 40. Further, the engine board 41 is configured to control only the revolution of the polygon motor 93, separately from the sequentially operated devices 51, when the engine board 41 receives the above interface command. That is, the controller 31 is configured to generate a request for revolving only the polygon motor 93, separately from a printing request for controlling the revolution of the polygon motor 93 together with the sequentially operated devices 51. The interface 47 and the polygon motor revolution controller 94 of the engine board 41 are configured so as to control only the revolution of the polygon motor 93 in response to receiving the request for revolving the polygon motor 93.

Further, the controller 31 is configured to start only the operation of feeding a sheet 4a among the operations of the sequentially operated devices 51 prior to starting the revolution of the polygon motor 93 for coping with a case that the time required for the sheet 4a to reach the registration rollers 6 after the sheet 4a has been started to be fed from the sheet cassette 2 or 3 is longer than the time the polygon motor 93 takes to reach a state of revolving at the number of revolutions corresponding to the picture element resolution for printing. Further, the engine board 41 is configured to cancel the request for revolving the polygon motor 93 so as to stop the polygon motor 93 when the engine board 41 does not receive a printing request within a predetermined time after receiving the request for revolving the polygon motor 93.

Figure 6:
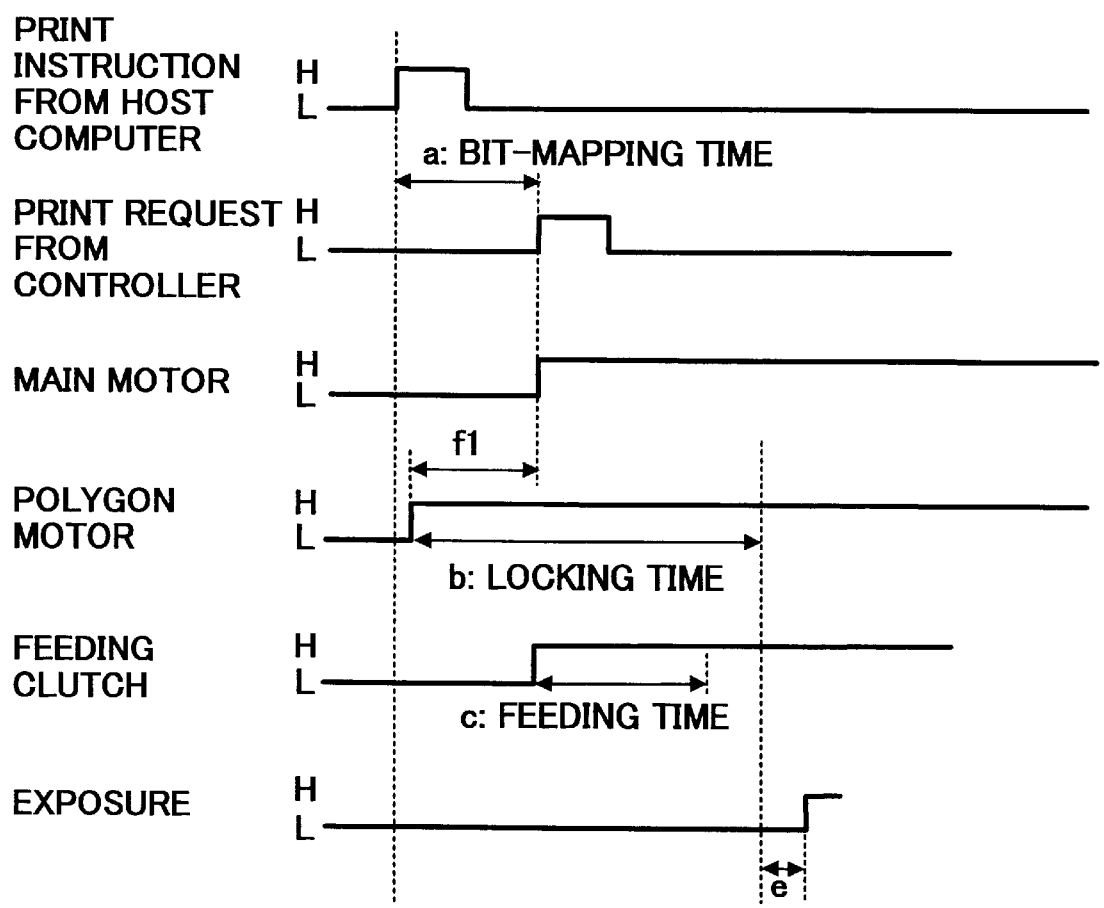
FIG. 6 is a timing chart illustrating a first example of the operating timing of the printer according to the present invention.
Figure 7:
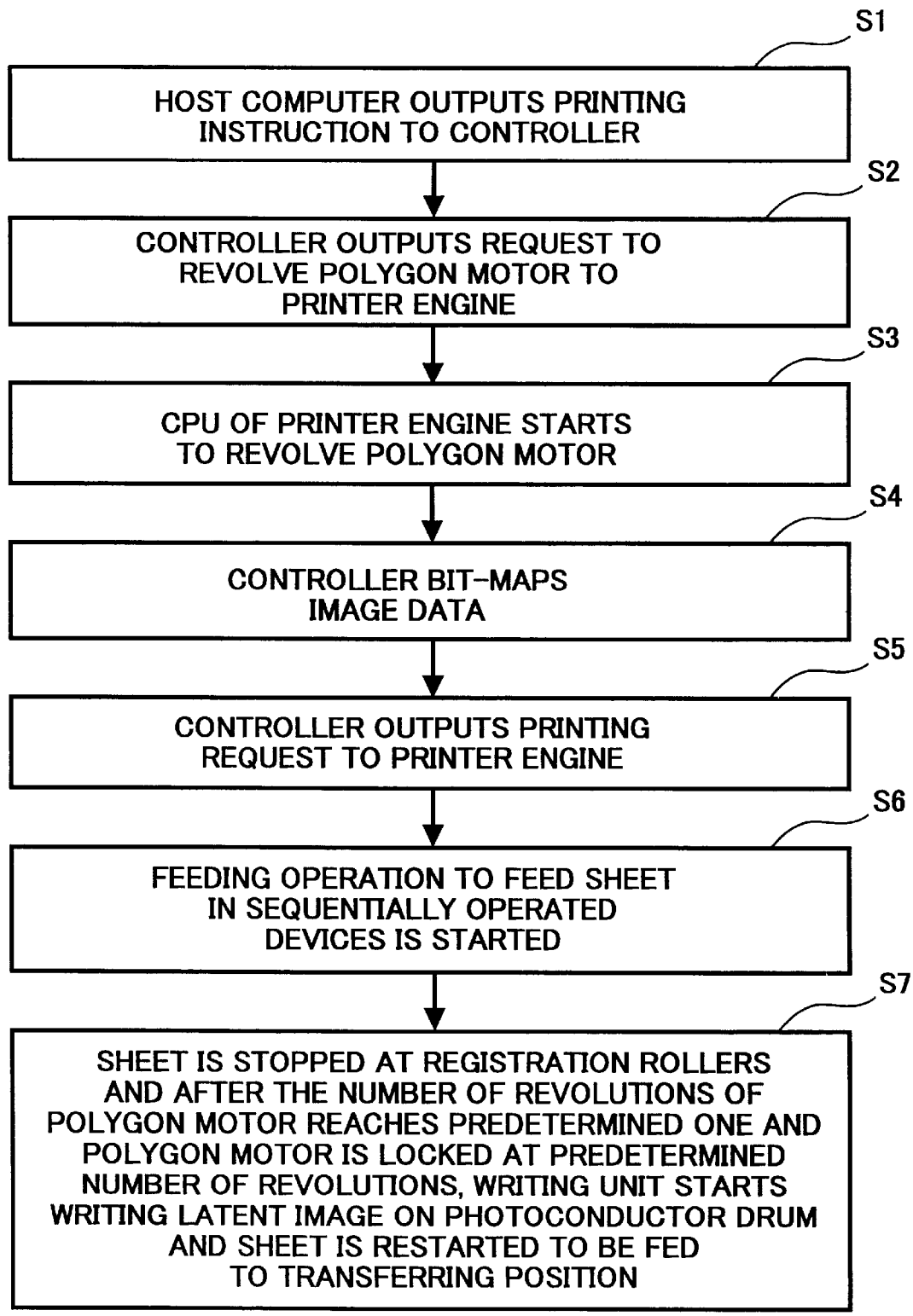
FIG. 7 is a flowchart of an exemplary operation of the printer with the operation timing of FIG. 6.

Next, the operation of the printer 1 is described referring to timing charts and flowcharts. FIG. 6 is a timing chart of a first example of the operating timings of the printer 1 and FIG. 7 is a flowchart of an exemplary operation of the printer 1 with such operating timings, according to the present invention. In this example, when the controller 31 is set such that the printer 1 forms an image with a single picture element resolution, after the controller 31 receives a printing instruction from the host computer 70, the controller 31 immediately outputs a request to revolve the polygon motor 93 to the printer engine 40. Thereafter, after the controller 31 completes image processing such as bit mapping image data, the controller 31 outputs a printing request to the printer engine 40. When the printer 1 is set to form an image according to a selected one of a plurality of picture element resolutions, after receiving the printing instruction from the host computer 70, the controller 31 immediately outputs to the printer engine 40 a request for revolving the polygon motor 93 attaching the information regarding the selected picture element resolution. The controller 31 then outputs a printing request to the printer engine 40 after image processing is completed.

The operations and the sequence of the operations of FIG. 6 are substantially the same as those in FIG. 14 except that a time "f" to revolve the polygon motor 93 prior to outputting the printing request to the printer engine 40 is added.

In FIG. 6, because the controller 31 outputs the printing request to revolve the polygon motor 93 immediately after receiving the printing instruction from the host computer 70, the signal is immediately made high in the operation of the polygon motor 94 when the printing instruction is received from the host computer 70. In this example, because only one picture element resolution is included or one picture element resolution is selected among from a plurality of picture element resolutions, the number of revolutions of the polygon motor 93 is determined according to the picture element resolution (FIG. 5). As a result, the time required for the polygon motor 93 to be locked at the number of revolutions as determined is determined according to the relationship in the table of FIG. 5. Further, in this example, the time required for each sheet to be fed to the registration rollers 6 from the feeding cassette 2 or 3 is constant, and the feeding time "c" is shorter than the locking time "b" required for the polygon motor 93 to be locked after the controller 31 outputs the printing request. Therefore, because the locking time "b" has already started during the time "f," which is the overlapping time of the bit-mapping time "a" and the locking time "b," before the bit-mapping time "a" ends, as illustrated in FIG. 6, the exposure can be also started earlier. Accordingly, the printing operation can be completed earlier.

Referring to FIG. 7, in step So, the host computer 70 outputs a printing instruction to the controller 31. In step So, the controller 31 outputs a request to revolve the polygon motor 93 to the printer engine 40. In step So, the CPU 45 of the printer engine 40 starts to revolve the polygon motor 93. In step So, the controller 31 bit-maps image data. In step So, the controller 31 outputs a printing (print sheet feeding) request to the printer engine 40. In step S6, a print sheet feeding operation to feed a sheet 4a in the sequentially operated devices 51 is started. In step S7, the sheet 4a is stopped at the registration rollers 6, and after the rate of revolution of the polygon motor 93 reaches a predetermined rate prescribed in FIG. 5 and the polygon motor 93 is locked at the predetermined number of revolutions, the writing unit 20 starts writing a latent image on the photoconductor drum 8 and the sheet 4a is re-started to be fed to the transfer position.

Figure 8:
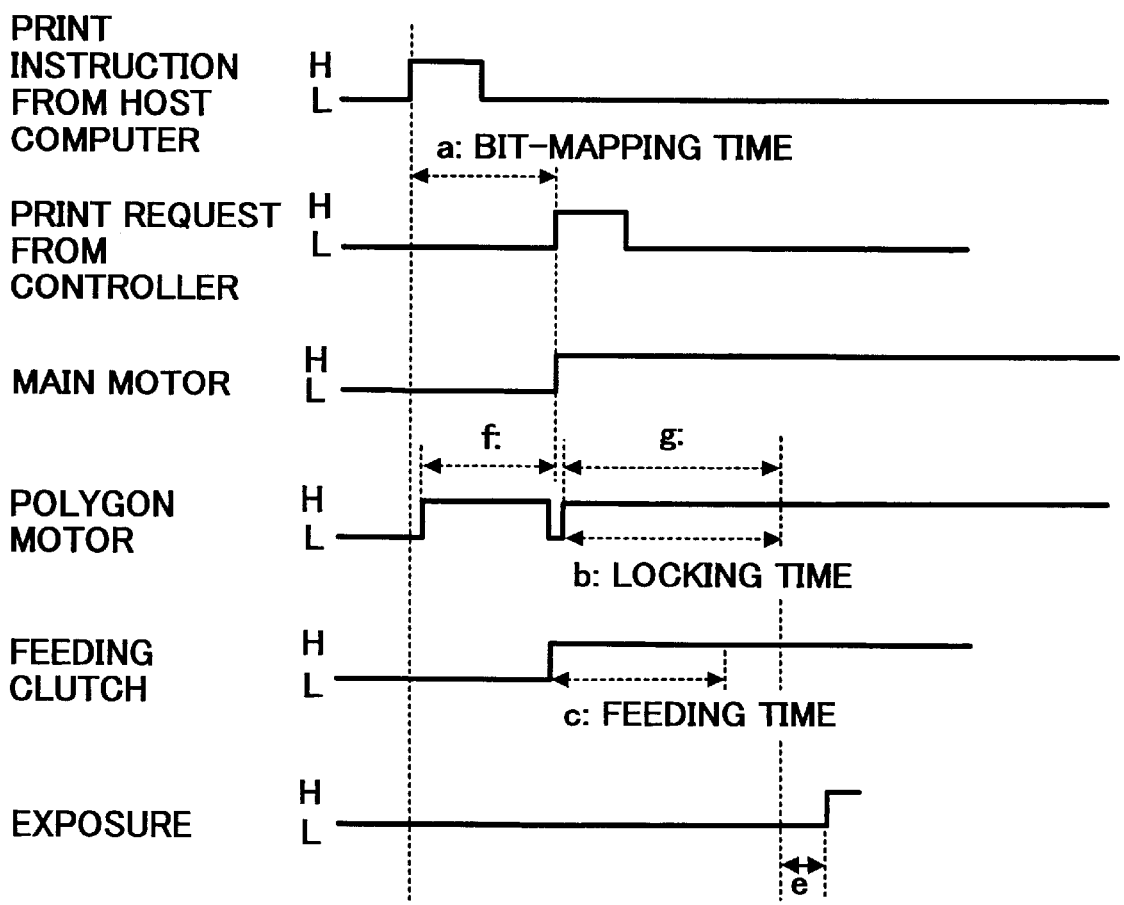
FIG. 8 is a timing chart illustrating a second example of the operating timing of the printer according to the present invention.
Figure 9B:
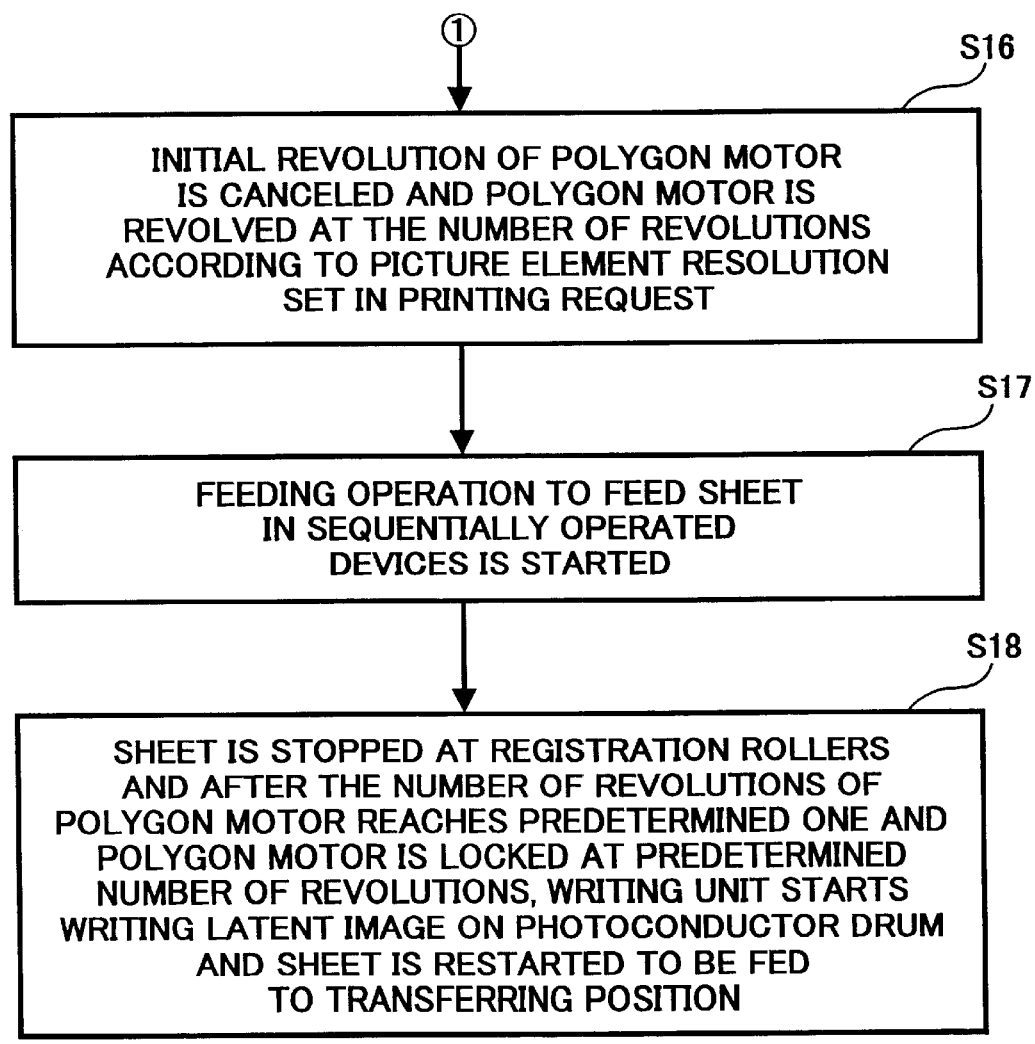
FIG. 9 is a flowchart of an exemplary operation of the printer with the operating timing of FIG. 8.

FIG. 8 is a timing chart of a second example of the operating timings of the printer 1, and FIG. 9 is a flowchart of an exemplary operation of the printer 1 with such operating timings, according to the present invention. In this second example, the printer 1 is configured to form an image according to a selected one of a plurality of picture element resolutions. After the controller 31 receives a printing instruction from the host computer 70, the controller 31 immediately outputs to the printer engine 40 a request to revolve the polygon motor 93 according to the picture element resolution, which is set in advance in the printer engine 40. After the controller 31 completes image processing, such as bit-mapping of image data, the controller 31 outputs a printing request including the information regarding the number of revolutions of the polygon motor 93 corresponding to the picture element resolution used for printing.

The operations and the sequence of the operations are similar to those in FIG. 14 except with respect to the addition of a time "f" to revolve the polygon motor 93 at the rate set in the printer engine 40 as default setting prior to outputting the printing request to the printer engine 40 and a time "g" required for the polygon motor 93 to reach a state of revolving at the rate corresponding to the picture element resolution actually used in forming an image.

In FIG. 8, because the controller 31 outputs a request to revolve the polygon motor 93 at the number of revolutions corresponding to the picture element resolution set as the initial default setting immediately after receiving a printing instruction from the host computer 70, the signal for an operation of the polygon motor 93 is made high immediately after the controller 31 receives the printing instruction from the host computer 70. In this example, because a picture element resolution is selected among from a plurality of picture element resolutions, the rate of revolution of the polygon motor 93 is determined according to the selected picture element resolution (FIG. 5). As a result, the time required for the polygon motor 93 to be locked at the rate as determined is determined according to the relationship as illustrated in the diagram of FIG. 5. Further, in this example, the time required for each sheet to be fed to the registration rollers 6 from the feeding cassette 2 or 3 is constant, and the feeding time "c" is shorter than the time polygon motor 93 takes to be locked after the controller 31 outputs the printing request. Therefore, in this example, the polygon motor 93 is revolved at the rate set as the default setting according to the request to revolve the polygon motor 93 the time "f" prior to the printing instruction. When the CPU 45 of the engine board 41 receives the printing instruction from the controller 31, the revolution of the polygon motor 93 at the rate set as the default setting is cancelled, and the polygon motor 93 is revolved at the number of revolutions according to the printing instruction. The time "g" required for the polygon motor 93 to reach a state of revolving at the number of revolutions for forming an image is relatively short (compared with a case that the polygon motor 93 starts to revolve from a stopped condition) because the polygon motor 93 has been already revolving for the time "f." Accordingly, the exposure can be started earlier by the time "f," and thereby, the printing operation can be completed correspondingly earlier compared with the case illustrated in FIG. 14.

Referring to FIG. 9, in step S11, the host computer outputs a printing instruction to the controller 31. In step S12, the controller 31 outputs to the printer engine 40 a request to revolve the polygon motor 93. In step S13, the CPU 45 of the printer engine 40 starts revolving the polygon motor 93 at the number of revolutions set as the default setting. In step S14, the controller S14 bit-maps image data. In step S15, the controller 31 outputs a printing request to the printer engine 40. In step S16, the initial revolution of the polygon motor 93 is cancelled and the polygon motor 93 is revolved at the rate indicated in FIG. 5 according to the picture element resolution set in the printing request. In step S17, a print sheet feeding operation to feed a sheet 4a in the sequentially operated devices 51 is started. In step S18, the sheet 4a is stopped at the registration rollers 6, and after the rate of revolution of the polygon motor 93 reaches the predetermined rate prescribed in FIG. 5 and the polygon motor 93 is locked at the predetermined rate, the writing unit 20 starts writing a latent image on the photoconductor drum 8, and the sheet 4a is re-started to be fed to the transfer position.

Figures 10, 11:
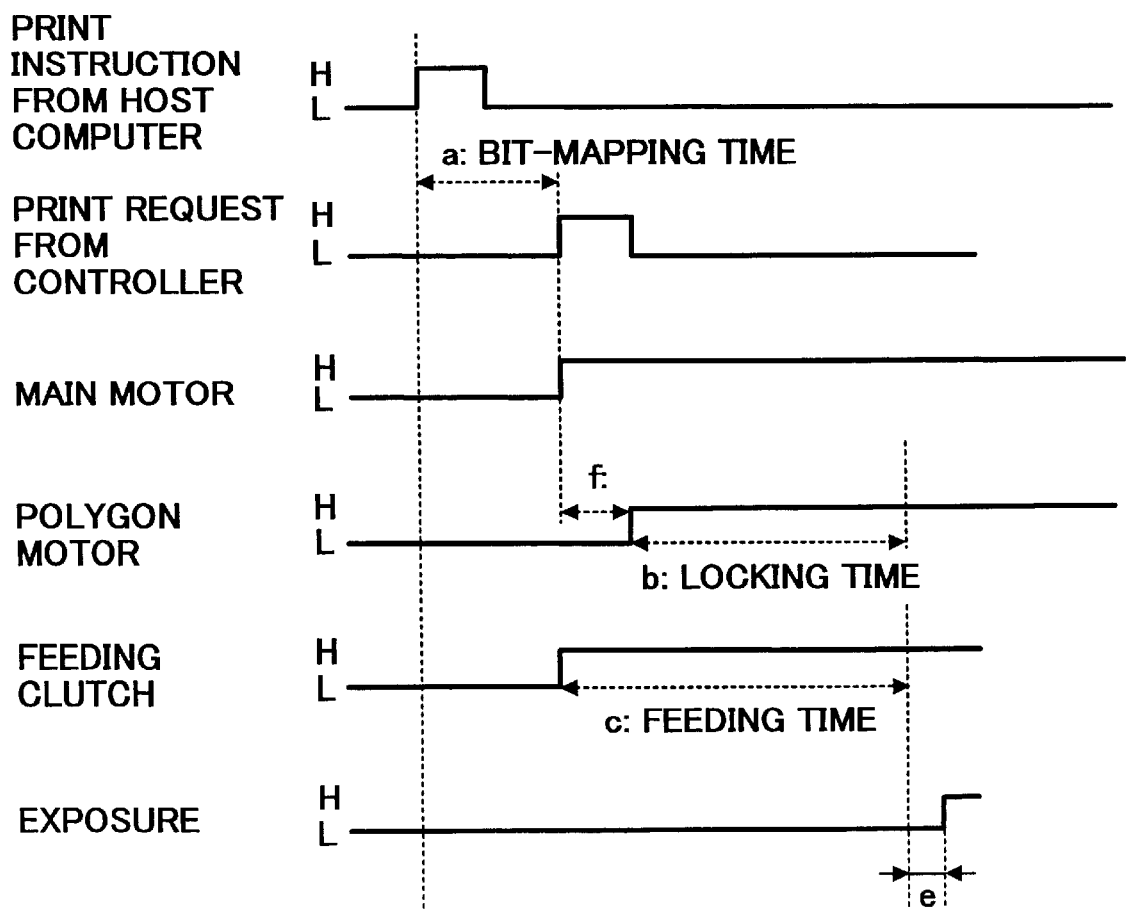
FIG. 10 is a table indicating exemplary times (feeding times) required for a sheet to reach registration rollers from each of three sheet feeding cassettes and a manual sheet feeding tray.
FIG. 11 is a timing chart illustrating a third example of the operating timing of the printer according to the present invention.

FIG. 10 is a table indicating exemplary times (feeding times) required for a sheet 4a to reach the registration rollers 6 from each of three sheet feeding cassettes and a manual sheet feeding tray.

Referring to FIG. 5 and FIG. 10, an exemplary relation between the sheet feeding operation and the locking time of the polygon motor 93 is explained. For example, when forming an image with the picture element resolution of 200 dpi on a sheet fed from the third sheet feeding cassette, the locking time of the polygon motor 93 is 2.0 sec and the time required for the sheet to reach the registration rollers 6 is 3.0 sec. Accordingly, if the sheet is started to be fed from the third sheet feeding cassette during the locking time "b," as in the above first and second examples of the operating timings, the sheet reaches the registration rollers 6 after the polygon motor 93 is locked. Therefore, in the following third example of the operating timings of the printer 1, the polygon motor 93 starts to be revolved during the feeding time "c."

Figure 12A:
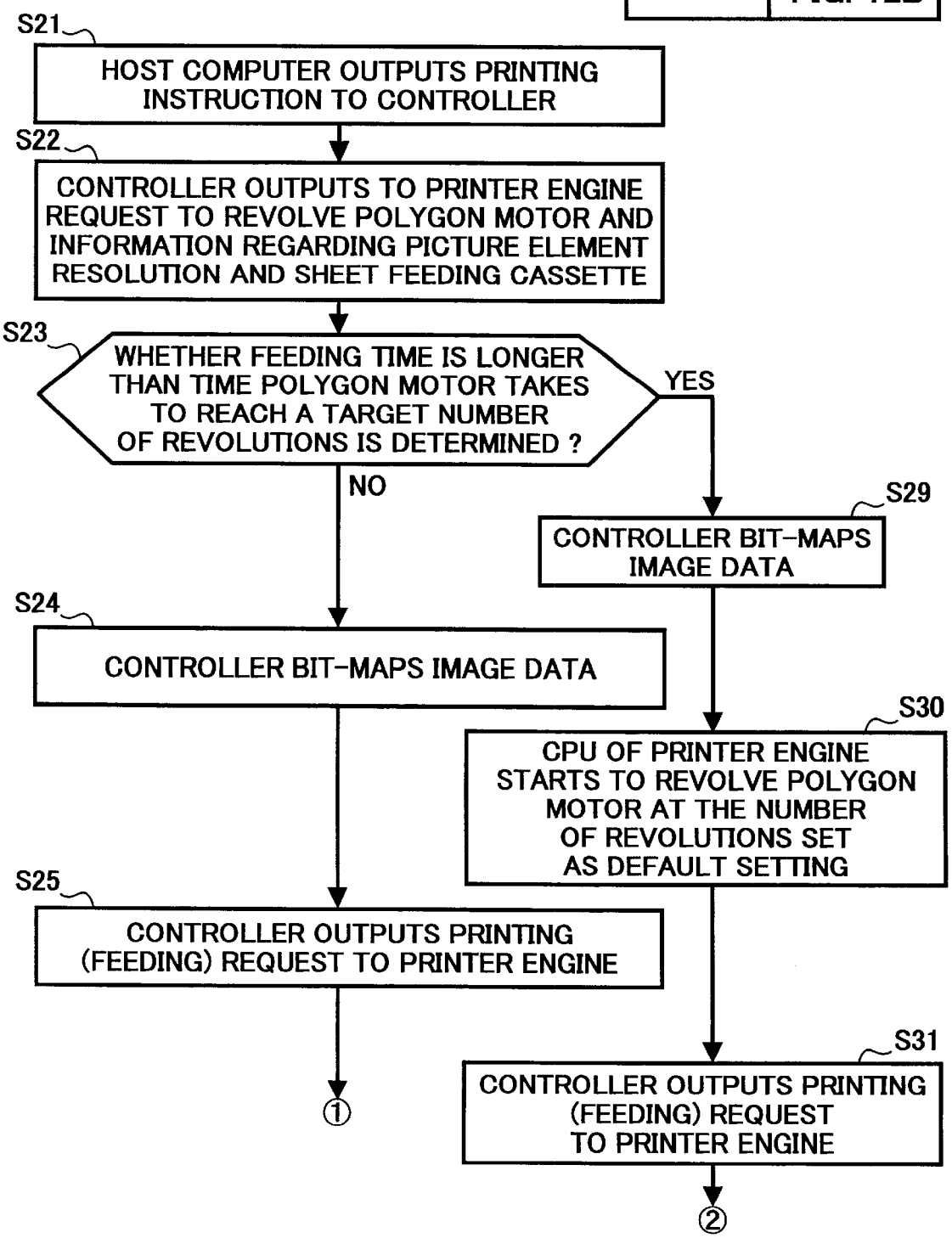
FIG. 12 is a flowchart illustrating an exemplary operation of the printer with the operating timing of FIG. 11.

FIG. 11 is a timing chart illustrating the third example of the operating timing of the printer 1, and FIG. 12 is a flowchart illustrating an exemplary operation of the printer 1 with the operating timing of FIG. 11. In this example, the printer 1 includes a plurality of sheet feeding cassettes 2, 3, and when the time required for a sheet 4a to reach the registration rollers 6 after having been started to be fed from a selected one of the plurality of feeding cassettes 2, 3 is longer than the time the polygon motor 93 takes to reach a state of revolving at the number of revolutions corresponding to the picture element resolution used for forming an image, the controller 31 outputs to the printer engine 40 a request to revolve the polygon motor 93 a predetermined time after the sheet 4a has started to be fed.

The operations and the sequence of the operations are similar to those in FIG. 14 except with regard to the addition of a time "f" to delay the time to start revolving the polygon motor 93.

In FIG. 11, when the controller 31 receives a printing instruction from the host computer 70, the controller 31 does not output a request to revolve the polygon motor 93 immediately and bit-maps image data. In this example, the rate of revolution of the polygon motor 93 is determined according to the picture element resolution, and the locking time of the polygon motor 93 is determined accordingly as prescribed in FIG. 5. Further, in this example, the time required for a sheet 4a to reach the registration rollers 6 from the feeding cassette 2 or 3 is determined as prescribed in FIG. 10, and the feeding time "c" is longer than the locking time "b" required for the polygon motor 93 to reach the locked state after having started to revolve. In this example, as illustrated in FIG. 11, the print sheet feeding operation is started prior to starting to revolve the polygon motor 93 after the printing request has been received by the printer engine 40. That is, the polygon motor 93 is delayed by the time "f" before starting to revolve. The time "f" is the difference between the sheet feeding time "c" determined as prescribed in FIG. 10 and the locking time "b" determined as prescribed in FIG. 5. Accordingly, it is avoided that the sheet 4a reaches the registration rollers 6 after the polygon motor 93 has been locked, and the sheet time "c" and the locking time "b" can end at substantially the same time.

Referring to FIG. 12, in step S21, the host computer 70 outputs a printing instruction to the controller 31. In step S22, the controller 31 outputs to the printer engine 40 a request to revolve the polygon motor 93. The request includes information regarding the picture element resolution for printing and information regarding the sheet feeding cassette from which a sheet is fed. In step S23, it is determined whether the sheet feeding time is longer than the time required for the polygon motor 93 to reach a target rate of revolution. If the feeding time is longer (i.e., the answer to the step S23 is yes), the operation progresses to step S24, and if the feeding time is not longer (i.e., the answer to step S23 is no), the operation progresses to step S29. In step S24, the controller 31 bit-maps image data. In step S25, the controller 31 outputs a printing (sheet feeding) request to the printer engine 40. In step S26, the feeding operation (the operation to feed a sheet in the sequentially operated devices 51) is started. In step S27, after the time "f" (the difference between the feeding time "c" and the locking time "b") elapses, the printer engine 40 starts to revolve the polygon motor 93 at the target rate of revolution as prescribed in FIG. 5 according to the picture element resolution set in the printing instruction.

In step S29, the controller 31 bit-maps image data. In step S30, the CPU 45 of the printer engine 40 starts to revolve the polygon motor 93 at the rate of revolution set as the default setting. In step S31, the controller 31 outputs a printing (sheet feeding) request to the printer engine 40. In step S32, after the time "f" (the difference between the locking time "b" and the feeding time "c") elapses, the printer engine 40 starts to revolve the polygon motor 93 at the target rate of revolution, as prescribed in FIG. 5 in accordance with the picture element resolution set in the printing instruction. In step S28, the registration rollers 6 stop the sheet 4a, and the writing unit 20 starts writing a latent image on the photoconductor drum 8 after the polygon motor 93 reaches a state of revolving and being locked at the prescribed rate of revolution.

Figure 13:
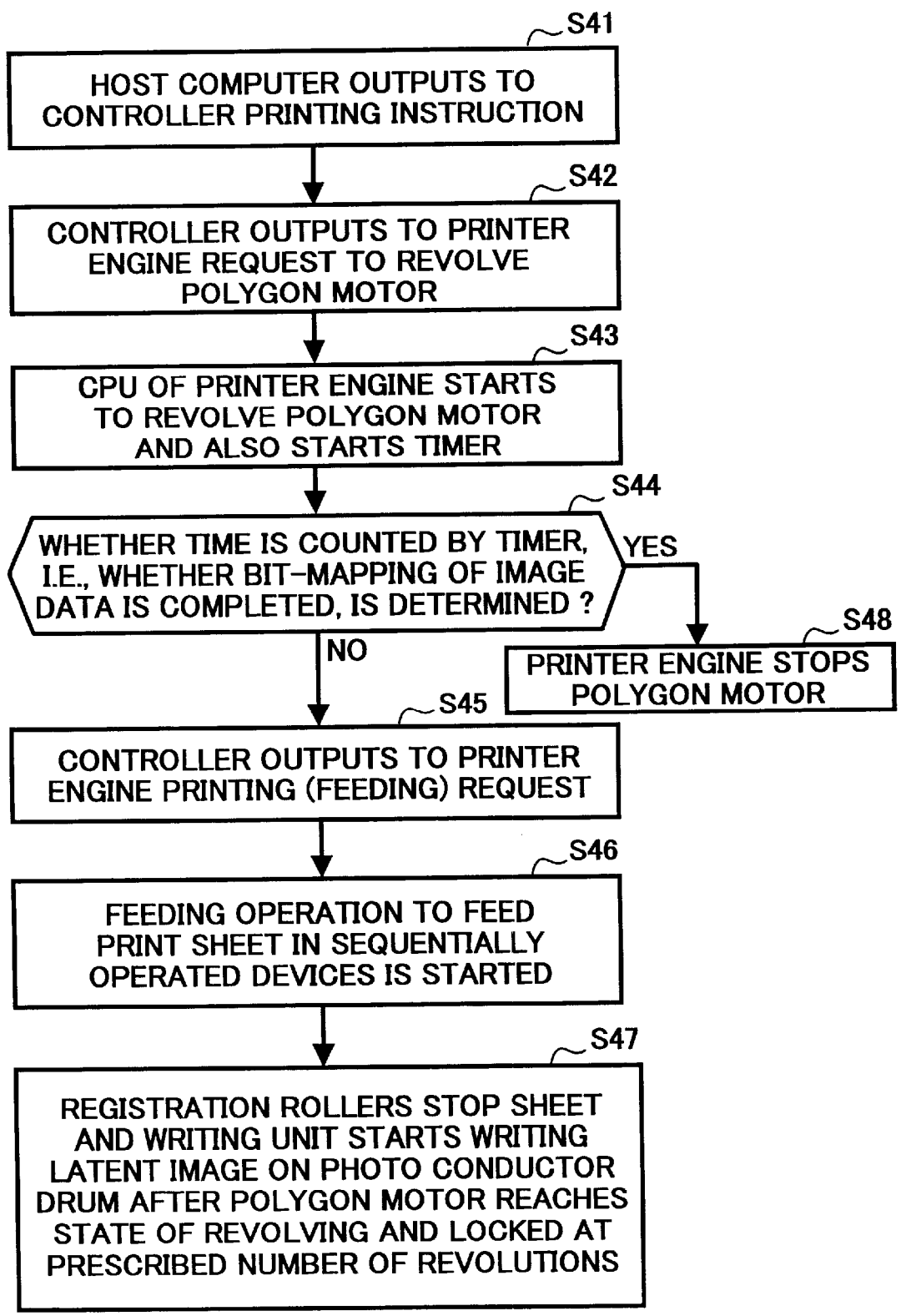
FIG. 13 is a flowchart illustrating another example of the operation of the printer with the operating timing of FIG. 11.

FIG. 13 is a flowchart illustrating another example of the operation of the printer 1 with the operating timings of FIG. 11. In this example, the printer engine 40 is configured to stop the polygon motor 93 when the printer engine 40 does not receive a printing request from the controller 31 even after a predetermined time elapses after having received a request to revolve the polygon motor 93 from the controller 31 and the polygon motor 93 has started to revolve.

In FIG. 13, in step S41, the host computer 70 outputs to the controller 31 a printing instruction. In step S42, the controller 31 outputs to the printer engine 40 a request to revolve the polygon motor 93. In step S43, the CPU of the printer engine 40 starts to revolve the polygon motor 93 and also starts a timer (not shown). The timer counts a predetermined time, which is sufficiently long to bit-map image data in the controller 31. In step S44, it is determined whether the predetermined time counted by the timer has elapsed, i.e., whether bit-mapping of the image data is completed. If the predetermined time is counted by the timer (i.e., the answer to step S44 is yes), the operation proceeds to step S48 and if the predetermined time is not counted by the timer (i.e., the answer to step S44 is no), the operation proceeds to step S45. In step S45, the controller 31 outputs to the printer engine 40 a printing (sheet feeding) request. In step S46, the sheet feeding operation to feed a print sheet 4a in the sequentially operated devices 51 is started. In step S47, the registration rollers 6 stop the sheet 4a and the writing unit 20 starts writing a latent image on the photoconductor drum 8 after the polygon motor 93 reaches a state of revolving and is locked at the prescribed rate of revolution in FIG. 5, for example.

Thus, the printer 1 configured as above can shorten the time for forming an image on a first sheet by a time of difference between a time when the polygon motor 93 starts to revolve and a time when a printing (sheet feeding) request is received by the printer engine 40 from the controller 31. Further, because the polygon motor 93 is configured to revolve at the rate of revolution according to the default picture element resolution in advance, the time the polygon motor 93 takes to reach a state of revolving at the rate of revolution corresponding to the picture element resolution for printing is shortened. As a result, the printing time for a first sheet is shortened. Still further, even when the sheet feeding time is longer than the locking time of the polygon motor 93 depending upon the combination of the picture element resolution for printing and the sheet feeding cassette from which a sheet 4a is fed, the life of the polygon motor 93 can be lengthened, and the printing time for a first print sheet can be shortened. Furthermore, even when the controller 31 operates erroneously or the controller 31 takes a longer time for bit-mapping image data after the polygon motor 93 has started to revolve for shortening the printing time for a first sheet, the revolution of the polygon motor 93 is stopped, and therefore, the life of the polygon motor 93 is lengthened.

Obviously, numerous modifications and variations of the present invention are possible in light of the above teachings. It is therefore to be understood that within the scope of the appended claims, the present invention may be practiced otherwise than as specifically described herein.

This application claims benefit of priority under 35 USC 120 to Japanese Patent Application No. 11-006993, filed in the Japanese Patent Office on Jan. 13, 1999, the entire contents of which, are incorporated herein by reference.

What is claimed is:

1. An image forming apparatus for forming an image on a photoconductor by scanning light on the photoconductor, the apparatus comprising;

a printer engine configured to form the image, the printer engine including a polygon motor configured to revolve at an arbitrary rate of revolution, a deflector driven by the polygon motor and configured to rotate to deflect the light, and a motor control configured to control the revolution of the polygon motor; and a controller configured to control the apparatus, configured to cause the polygon motor to stop revolving when the apparatus is in a waiting status, and configured to output to the printer engine, when the apparatus is set to form the image with a single picture element resolution, (1) a revolution request to revolve the polygon motor immediately after receiving a printing instruction to form the image from a host computer coupled to the apparatus and (2) a printing request to form the image after completing image processing for forming the image, said printing request being different from the printing instruction;

wherein the printer engine is configured to stop the revolution of the polygon motor when the printer engine does not receive the printing request from the controller within a predetermined time after receiving the revolution request from the controller.

2. An image forming apparatus according to claim 1, wherein the controller is further configured to output to the printer engine, when the apparatus is set to form the image with a selected one of a plurality of picture element resolutions, (1) the revolution request, including information corresponding to the selected picture element resolution for forming the image, immediately after receiving the printing instruction to form the image from the host computer and (2) the printing request to form the image after completing image processing for forming the image.

3. An image forming apparatus according to claim 2, wherein the controller is further configured to output to the printer engine (1) the revolution request, including a request to revolve the polygon motor according to a picture element resolution previously set in the printer engine, immediately after receiving the printing instruction from the host computer and (2) the printing request, including information corresponding to a revolution speed of the polygon motor associated with the selected picture element resolution for forming the image, after completing the image processing for forming the image.

4. An image forming apparatus for forming an image on a photoconductor by scanning light on the photoconductor, the apparatus comprising;

a printer engine configured to form the image, the printer engine including a polygon motor configured to revolve at an arbitrary rate of revolution, a deflector driven by the polygon motor and configured to rotate to deflect the light, and a motor control configured to control the revolution of the polygon motor;

a controller configured to control the apparatus, configured to cause the polygon motor to stop revolving when the apparatus is in a waiting status, and configured to output to the printer engine, when the apparatus is set to form the image with a single picture element resolution, (1) a revolution request to revolve the polygon motor immediately after receiving a printing instruction to form the image from a host computer coupled to the apparatus and (2) a printing request to form the image after completing image processing for forming the image; and print sheet feeding devices configured to feed a print sheet;

wherein the controller is further configured to output the revolution request to the printer engine a predetermined time after outputting the printing request to the printer engine, when a first time required for the print sheet to reach a registration roller to adjust a timing of the sheet to be fed to a transfer position of the printer engine where the image on the photoconductor is transferred to the sheet after the sheet has started to be fed by one of the print sheet feeding devices is longer than a second time required for the polygon motor to reach a state of revolving at the rate of revolution corresponding to the selected picture element resolution for forming the image after the printer engine has received the request to revolve the polygon motor.

5. An image forming apparatus for forming an image on a photoconductor by scanning light on the photoconductor, the apparatus comprising:

means for forming the image, including a polygon motor configured to revolve at an arbitrary rate of revolution, means for deflecting the light driven by the polygon motor, and means for controlling the revolution of the polygon motor; and means for controlling the apparatus, including means for causing the polygon motor to stop revolving when the apparatus is in a waiting status and means for outputting to the means for forming the image, when the apparatus is set to form the image with a single picture element resolution, (1) a revolution request to revolve the polygon motor immediately after receiving a printing instruction to form the image from a host computer coupled to the apparatus and (2) a printing request to form the image after completing image processing for forming the image, said printing request being different from the printing instruction;

wherein the means for forming the image comprises means for stopping the revolution of the polygon motor when the means for forming the image does not receive the printing request from the means for controlling the apparatus within a predetermined time after receiving the revolution request from the means for controlling the apparatus.

6. An image forming apparatus according to claim 5, wherein the means for controlling the apparatus further comprises:

means for outputting to the means for forming the image, when the apparatus is set to form the image with a selected one of a plurality of picture element resolutions, (1) the revolution request, including information corresponding to the selected picture element resolution for forming the image, immediately after receiving the printing instruction to form the image from the host computer and (2) the printing request to form the image after completing image processing for forming the image.

7. An image forming apparatus according to claim 6, wherein the means for controlling the apparatus further comprises:

means for outputting to the means for forming the image (1) the revolution request, including a request to revolve the polygon motor according to a picture element resolution previously set in the means for forming the image, immediately after receiving the printing instruction from the host computer and (2) the printing request, including information corresponding to a revolution speed of the polygon motor associated with the selected picture element resolution for forming the image, after completing the image processing for forming the image.

8. An image forming apparatus for forming an image on a photoconductor by scanning light on the photoconductor, the apparatus comprising:

means for forming the image, including a polygon motor configured to revolve at an arbitrary rate of revolution, means for deflecting the light driven by the polygon motor, and means for controlling the revolution of the polygon motor;

means for controlling the apparatus, including means for causing the polygon motor to stop revolving when the apparatus is in a waiting status and means for outputting to the means for forming the image, when the apparatus is set to form the image with a single picture element resolution, (1) a revolution request to revolve the polygon motor immediately after receiving a printing instruction to form the image from a host computer coupled to the apparatus and (2) a printing request to form the image after completing image processing for forming the image; and plural means for feeding a print sheet;

wherein the means for controlling the apparatus further comprises means for outputting the revolution request to the means for forming the image a predetermined time after outputting the printing request to the means for forming the image, when a first time required for the print sheet to reach a registration roller to adjust a timing of the sheet to be fed to a transfer position of the means for forming the image where the image on the photoconductor is transferred to the sheet after the sheet has started to be fed by one of the plural means for feeding a print sheet is longer than a second time required for the polygon motor to reach a state of revolving at the rate of revolution corresponding to the selected picture element resolution for forming the image after the means for forming the image has received the request to revolve the polygon motor.

9. A method for forming an image on a photoconductor with an image forming apparatus connected to a host computer and including a controller configured to control the apparatus and a printer engine configured to form the image, the printer engine including a polygon motor configured to revolve at an arbitrary rate of revolution, a deflector driven by the polygon motor and configured to rotate to deflect light, and a motor control configured to control the revolution of the polygon motor, the method comprising the steps of:

stopping the revolution of the polygon motor when the apparatus is in a waiting status;

receiving a printing instruction to form the image from the host computer;

starting the revolution of the polygon motor immediately after receiving the printing instruction to form the image is received from the host computer;

starting to form the image with the printer engine after image processing for forming the image is completed; and stopping the revolution of the polygon motor when the printer engine does not receive a printing request from the controller in a predetermined time after the polygon motor has started to revolve, said printing request being different from the printing instruction.

10. A method according to claim 9, further comprising the step of:

when the apparatus is set to form the image with a selected one of a plurality of picture element resolutions, revolving the polygon motor according to a selected picture element resolution for forming the image.

11. A method according to claim 10 further comprising the step of:

revolving the polygon motor at first according to a picture element resolution previously set in the printer engine and then revolving the polygon motor according to the selected picture element resolution for forming the image.

12. A method for forming an image on a photoconductor with an image forming apparatus connected to a host computer and including a controller configured to control the apparatus, print sheet feeding devices configured to feed a print sheet, and a printer engine configured to form the image, the printer engine including a polygon motor configured to revolve at an arbitrary rate of revolution, a deflector driven by the polygon motor and configured to rotate to deflect light, and a motor control configured to control the revolution of the polygon motor, the method comprising the steps of:

stopping the revolution of the polygon motor when the apparatus is in a waiting status;

receiving a printing instruction to form the image from the host computer;

starting the revolution of the polygon motor immediately after receiving the printing instruction to form the image is received from the host computer;

starting to form the image with the printer engine after image processing for forming the image is completed; and starting to revolve the polygon motor a predetermined time after the printer engine has started to form the image when a first time required for the print sheet to reach a registration roller to adjust a timing of the sheet to be fed to a transfer position of the printer engine where the image on the photoconductor is transferred to the sheet after the sheet has started to be fed is longer than a second time required for the polygon motor to reach a state of revolving at a number of revolutions corresponding to a picture element resolution for forming the image after the polygon motor is started to revolve.

* * * * *